Reissued June 22, 1937 Re. 20,421

UNITED STATES PATENT OFFICE 20,421

ALLOY STEEL AND METHOD OF MAKING SAME

Peter Payson, New York, N. Y., assignor to Crucible Steel Company of America, New York, N. Y., a corporation of New Jersey No Drawing. Original No. 2,009,974, dated July 30, 1935, Serial No. 6,645, February 15, 1935. Application for reissue July 22, 1936, Serial No. 91,993

21 Claims. (Cl. 148—21.5)

My invention resides in the discovery of a new steel and in a method for hardening the same. The new steel is hardenable by said method up to "C" 65 Rockwell or more; it does not suffer any substantial permanent reduction in hardness after heating as high as 1400 or 1600° F., or in some instances to even higher temperatures; and thereby distinguishes from all known steels of which I am aware.

In addition, the new steel possesses a degree of hardness at temperatures of 1100° to 1800° F. or higher, which is superior to that of all known steels. The new steel is, moreover, resistant to corrosion, oxidation and scaling at elevated temperatures. It is, accordingly, exceptionally well adapted for such uses as valves and valve seats for internal combustion engines, hot work dies, die casting dies, high speed and other cutting, shearing, and forming tools, and the like.

Of the known steels, the austenitic chrome-nickel alloys with or without additions of molybdenum, tungsten, titanium vanadium, silicon, etc., will retain their initial hardness when tempered up to 1600° F., but such steels are incapable of high hardness comparable to that of the steels of my invention. The available normally ferritic steels hardened in accordance with recognized practices, temper or soften when reheated after hardening. Although certain of these steels may be so hardened initially as to be susceptible to a slight carbide precipitation hardening at some retempering temperature up to about 1100° F., they soften rapidly as the temperature is increased above 1100° F.

I have discovered, however, that certain ferrochrome alloys containing nickel-like metal, such as either or both of nickel and manganese, and containing molybdenum-like metal, such as either or both of molybdenum and tungsten, in appropriate proportions, are susceptible to hardening by heating, with the resulting advantages and to the degree of hardness characterizing my invention as aforesaid.

Steel conforming to the invention may be produced for example by alloying about 18% to 35% chromium, about 1% to 10% nickel-like metal, about 1% to 10% molybdenum-like metal, with ferro-metal, and heating within the approximate temperature range of 1200° to 1800° F. for an interval required to secure a desired hardening. The resulting hardness of the new steel is substantially unaffected by the rate of cooling.

The new steel may contain carbon in amounts ranging from the lowest percentages found in commercial steels, for example .03%,—up to about 1.0%.

The alloying ingredients are preferably combined in such relative proportions as to render the steel initially ferritic, and by "initially ferritic" I mean ferritic in the "as annealed", "as cast", "as rolled", or "as forged" condition.

It will be understood that it is the treatment by adding chromium, molybdenum-like metal and nickel-like metal in the proportions stated and the heat hardening, which distinguish the steel of my invention and the process of treating the same from those heretofore known, and that iron or steel containing the usual impurities within commercial tolerances and also other ingredients for imparting thereto well known characteristics of commercial steel alloys, are to be considered as a ferro-metal to which my invention may be applicable. Thus broadly stated the new steel of my invention will contain the following, preferably in proportions to render the steel initially ferritic:

| | |
|---|---|
| Chromium, about | 18% to 35% |
| Molybdenum-like metal, about | 1% to 10% |
| Nickel-like metal, about | 1% to 10% |
| Ferro-metal, about | 45% to 80% |

Steel conforming to the information above set forth may be readily rolled or forged into any of the usual shapes imparted to iron or steel, and is likewise useful in cast form.

The degree of hardness acquired by the new steel in consequence of the heat hardening depends in part on the particular composition as well as on the prehardened condition, on the hardening temperature employed, and on the duration of heating, in the manner indicated by Tables I to IX, inclusive, presented and referred to hereinafter.

The heat hardening may be accompanied by a marked reduction in magnetic permeability of the steel, and hence presumably, by some phase change from an initially ferritic to a substantially non-ferritic state, as is evidenced by:

TABLE I

*Effect of heat treatment on hardness and magnetic changes*

[Steel:—.1% C, 5.0% Ni, 30.0% Cr, 7.5% Mo]

| | Hardness—Rockwell "C" | Maximum induction gausses [1] |
|---|---|---|
| As rolled | 36 | 6600 |
| Reheated 1400° F., 1 hour, air cooled | 63 | 810 |
| Reheated 1400° F., 15 hours, air cooled | 64 | 800 |
| Reheated 1600° F., 2 hours, air cooled | 64 | 800 |
| Reheated 1800° F., 2 hours, air cooled | 64 | 760 |
| Reheated 2000° F., 2 hours, air cooled | 32 | 8900 |

[1] For magnetizing force of 300 oersteds.

These data show that heating above the hardening range of about 1200° to 1800°, results in restoration of the initial order of magnitude of permeability, thereby indicating a reversion of the steel from a non-ferritic to a ferritic condition.

The hardness of heat hardened steel in accordance with this invention is, as stated, substantially unaffected by subsequent reheatings to temperatures up to 1400 or 1600° F. or even higher for some analyses, and this irrespective of the number, duration or temperature of individual heats, as appears from:

TABLE II

| Type of steel percentage of— | | | Hardness—Rockwell "C" | | | | | | | |
|---|---|---|---|---|---|---|---|---|---|---|
| | | | As hardened by heating at 1400° F. for 16 hrs. | Hardness after reheating 1 hour at temperatures indicated in ° F. | | | | | | |
| Cr | Ni | Mo | | 600° | 800° | 1000° | 1200° | 1400° | 1600° | 1800° |
| 27.0 | 2.5 | 4.5 | 30 | 30 | 30 | 30 | 30 | 30 | 30 | -------- |
| 27.0 | 5.0 | 1.5 | 35 | 35 | 35 | 35 | 35 | 35 | 30 | -------- |
| 24.0 | 5.0 | 4.5 | 40 | 40 | 40 | 40 | 40 | 40 | 40 | -------- |
| 27.0 | 5.0 | 4.5 | 47 | 47 | 47 | 47 | 47 | 47 | 47 | 30 |
| 30.0 | 5.0 | 7.5 | 60 | 60 | 60 | 60 | 60 | 60 | 60 | 60 |

In contrast to this performance, known steels of comparable initial hardness either soften progressively with increase of tempering temperature, or are subject to variation in hardness for reheating temperatures up to about 1100° F., and to rapid softening for higher temperatures. The steel of this invention, is, therefore, of superior utility in comparison with known steels for applications where maintenance of hardness in service conditions involving elevated temperatures is important, such as those mentioned above.

I have also found that hardening of the new steel is a function of time at temperature, and is more readily secured and to an increased degree if the steel is in the "as forged" or "as rolled" condition before hardening, as compared to hardening from the annealed condition, as appears from:

TABLE III

*Effect on hardenability of prehardening condition*

[Steel:—.07% C, 5.2% Ni, 27.6% Cr, 1.2% Mo]

| Prehardening condition | Rockwell "C" hardness | | | | |
|---|---|---|---|---|---|
| | Initial hardness | After reheating for indicated time at 1400° F. | | | |
| | | 1 hr. | 4 hrs. | 16 hrs. | 96 hrs. |
| As rolled | 35 | 42 | 48 | 49 | 50 |
| As annealed at: | | | | | |
| 1800° F. for 1 hr | 18 | 24 | 38 | 44 | 47 |
| 2200° F. for 1 hr | 18 | 20 | 31 | 40 | 46 |

Other factors remaining constant, maximum hardness is secured for steels having a carbon content below approximately 1.0%, but the hardness is increased progressively by additions of chromium, manganese, molybdenum or tungsten within the limits specified as is shown by Tables IV to IX inclusive, as follows:

TABLE IV

*Effect of carbon on hardenability*

| Cr constant at 24.0%<br>Ni constant at 5.0%<br>Mo constant at 3.0% | | | Cr constant at 27.0%<br>Ni constant at 5.0%<br>Mo constant at 4.5% | | |
|---|---|---|---|---|---|
| C | Hardness, Rockwell "C" | | C | Hardness, Rockwell "C" | |
| | Annealed | Hardened | | Annealed | Hardened |
| .07 max. | 18 | 38 | .07 max. | 25 | 54 |
| .10/.15 | 19 | 42 | .10/.15 | 24 | 55 |
| .20/.25 | 24 | 34 | .20/.25 | 24 | 51 |
| .30/.35 | 23 | 35 | .30/.35 | 25 | 47 |

TABLE V

*Effect of Cr on hardenability*

C constant at .10/.15%
Ni constant at 5.0%
Mo constant at 4.5%

| Cr | Hardness, Rockwell "C" | |
|---|---|---|
| | Annealed | Hardened |
| 18 | 15 | 23 |
| 21 | 21 | 46 |
| 24 | 25 | 47 |
| 27 | 24 | 55 |
| 30 | 24 | 60 |

TABLE VI

*Effect of Ni on hardenability*

| C constant at .10/.15%<br>Cr constant at 27.0%<br>Mo constant at 1.5% | | | C constant at .10/.15%<br>Cr constant at 27.0%<br>Mo constant at 4.5% | | |
|---|---|---|---|---|---|
| Ni | Hardness, Rockwell "C" | | Ni | Hardness, Rockwell "C" | |
| | Annealed | Hardened | | Annealed | Hardened |
| 2.5 | 14 | 21 | 2.5 | 19 | 48 |
| 5.0 | 18 | 44 | 5.0 | 24 | 55 |
| 7.5 | 18 | 45 | 7.5 | 25 | 53 |

TABLE VII

*Effect of Mn on hardenability*

| C constant at .10% max.<br>Cr constant at 27.0%<br>Mo constant at 4.5% | | |
|---|---|---|
| Mn | Hardness, Rockwell "C" | |
| | Annealed | Hardened |
| 3.0 | 17 | 44 |
| 6.0 | 19 | 56 |
| 9.0 | 20 | 60 |

A comparison of the results in Tables VI and VII shows that as regards its effect on hardenability, manganese may be substituted in whole or in part for nickel.

TABLE VIII

*Effect of Mo on hardenability*

| C constant at .10/.15%<br>Cr constant at 27.0%<br>Ni constant at 2.5% | | | C constant at .10/.15%<br>Cr constant at 27.0%<br>Ni constant at 5.0% | | |
|---|---|---|---|---|---|
| Mo | Hardness, Rockwell "C" | | Mo | Hardness, Rockwell "C" | |
| | Annealed | Hardened | | Annealed | Hardened |
| 1.5 | 14 | 21 | 1.5 | 18 | 44 |
| 3.0 | 17 | 37 | 3.0 | 20 | 51 |
| 4.5 | 19 | 48 | 4.5 | 24 | 55 |
| | | | 6.0 | 26 | 55 |
| | | | 7.5 | 27 | 60 |

TABLE IX

*Effect of W on hardenability*

| C constant at .10% max.<br>Cr constant at 27.0%<br>Ni constant at 5.0% | | |
|---|---|---|
| W | Hardness, Rockwell "C" | |
| | Annealed | Hardened |
| 2.0 | 18 | 36 |
| 4.0 | 21 | 37 |
| 6.0 | 23 | 46 |

A comparison of the results in Tables VIII and IX shows that as regards its effect on hardenability, tungsten may be substituted in whole or in part for molybdenum.

The choice of proportions in each instance depends, of course, on the nature of individual applications.

The new steels, particularly those containing relatively high percentages of chromium, nickel and molybdenum, or their equivalents, are more resistant than are the known steels to many acids and other corroding media, and are, moreover, highly resistant to oxidation and scaling at elevated temperatures.

In the appended claims by the term "nickel-like metal", I mean to include either or both of nickel and manganese; by the term "molybdenum-like metal" I mean to include either or both of molybdenum and tungsten; and by the term "balance substantially all iron" I mean to include iron and steel containing commercial impurities.

What is claimed is:

1. An alloy steel containing: about 18% to 35% chromium, about 1% to 10% nickel-like metal, about 1% to 10% molybdenum-like metal, carbon up to about 1.0%, and the balance substantially all iron, in proportions to render said steel initially ferritic, said steel being hardened by heating within the approximate temperature range of 1200° to 1800° F.

2. An alloy steel containing: about 18% to 35% chromium, about 1% to 10% nickel-like metal, about 1% to 10% molybdenum-like metal, carbon up to about 1.0%, and the balance substantially all iron in proportions to render said steel initially ferritic, said steel being hardened by heating within the approximate temperature range of 1200° to 1800° F., and developing its maximum hardness after heating within said range.

3. An alloy steel containing: about 18% to 35% chromium, about 1% to 10% nickel-like metal, about 1% to 10% molybdenum-like metal, carbon up to about 1.0%, and the balance substantially all iron in proportions to render said steel initially ferritic, said steel being hardened by heating within the approximate temperature range of 1200° to 1800° F., and undergoing no substantial reduction in hardness after heating as high as about 1400° F.

4. An alloy steel containing: about 18% to

35% chromium, about 1% to 10% nickel-like metal, about 1% to 10% molybdenum-like metal in proportions to render said steel initially ferritic, carbon up to about 1.0%, and the balance substantially all iron, said steel being hardened by heating within the approximate temperature range of 1200° to 1800° F., and undergoing no substantial reduction in hardness after heating as high as about 1800° F.

5. An alloy steel containing: about 18% to 35% chromium, about 1% to 10% nickel, about 1% to 10% molybdenum, carbon up to about 1.0%, and the balance substantially all iron in proportions to render said steel initially ferritic, said steel being hardened by heating within the approximate temperature range of 1200° to 1800° F.

6. An alloy steel containing: about 18% to 35% chromium, about 1% to 10% manganese, about 1% to 10% molybdenum, carbon up to about 1.0%, and the balance substantially all iron in proportions to render said steel initially ferritic, said steel being hardened by heating within the approximate temperature range of 1200° to 1800° F.

7. An alloy steel containing: about 18% to 35% chromium, about 1% to 10% nickel, about 1% to 10% tungsten, carbon up to about 1.0%, and the balance substantially all iron in proportions to render said steel initially ferritic, said steel being hardened by heating within the approximate temperature range of 1200° to 1800° F.

8. An alloy steel containing: about 18% to 35% chromium, about 1% to 10% manganese, about 1% to 10% tungsten, carbon up to about 1.0%, and the balance substantially all iron in proportions to render said steel initially ferritic, said steel being hardened by heating within the approximate temperature range of 1200° to 1800° F.

9. The method of producing a heat hardened alloy steel consisting of about 18% to 35% chromium, about 1% to 10% nickel-like metal, about 1% to 10% molybdenum-like metal, and carbon up to about 1.0%, and the balance substantially all iron in proportions to render said steel initially ferritic, said method comprising: heating said alloy within the approximate temperature range of 1200° to 1800° F. to harden.

10. The method of producing a heat hardened alloy steel consisting of about 18% to 35% chromium, about 1% to 10% nickel-like metal, about 1% to 10% molybdenum-like metal, and carbon up to about 1.0%, and the balance substantially all iron in proportions to render said steel initially ferritic, said method comprising: heating said steel within the approximate temperature range of 1200° to 1800° F. for an interval required to secure substantially maximum hardening of said steel.

11. An article made of a heat hardenable alloy steel, resistant to corrosion, oxidation and scaling, and containing: about 18% to 35% chromium, about 1% to 10% nickel-like metal, about 1% to 10% molybdenum-like metal, carbon up to about 1.0%, and the balance substantially all iron in proportion to render said steel initially ferritic, said steel being hardened by heating within the approximate temperature range of 1200° to 1800° F.

12. An article made of a heat hardenable alloy steel, resistant to corrosion, oxidation and scaling and containing: about 18% to 35% chromium, about 1% to 10% nickel-like metal, about 1% to 10% molybdenum-like metal, carbon up to about 1.0%, and the balance substantially all iron in proportion to render said steel initially ferritic, said steel being hardened by heating within the approximate temperature range of 1200° to 1800° F., and undergoing no substantial reduction in hardness after heating as high as about 1400° F.

13. An article made of a heat hardenable alloy steel, resistant to corrosion, oxidation and scaling, and containing: about 18% to 35% chromium, about 1% to 10% nickel-like metal, about 1% to 10% molybdenum-like metal, carbon up to about 1.0%, and the balance substantially all iron in proportion to render said steel initially ferritic, said steel being hardened by heating within the approximate temperature range of 1200° to 1800° F., and undergoing no substantial reduction in hardness after heating as high as about 1800° F.

14. An alloy steel containing: about 18 to 35% chromium, about 1 to 10% nickel-like metal, and about 1 to 10% molybdenum-like metal in proportions to render said steel initially ferritic, characterized in being hardened by heating said steel and holding within the approximate temperature range of 1200 to 1800° F. until hardened, and in thereafter undergoing no substantial reduction in hardness after heating to temperatures as high as about 1400° F.

15. An alloy steel containing: about 18 to 35% chromium, about 1 to 10% nickel-like metal, and about 1 to 10% molybdenum-like metal in proportions to render said steel initially ferritic, characterized in being hardened in excess of "C" 32 Rockwell by heating said steel and holding within the approximate temperature range of 1200 to 1800° F. until hardened, and in thereafter undergoing no substantial reduction in hardness after heating to temperatures as high as about 1400° F.

16. An article made of an alloy steel according to claim 14.

17. A valve or valve element for internal combustion engines made of an alloy steel according to claim 14.

18. A cutting, forming or shearing tool made of an alloy steel according to claim 14.

19. An article for use in the temperature range of about 1200 to 1800° F., made of an alloy steel according to claim 14.

20. The method of producing a heat hardened alloy steel containing about 18 to 35% chromium, about 1 to 10% nickel-like metal and about 1 to 10% molybdenum-like metal, in proportions to render said steel initially ferritic, which comprises, heating said steel and holding within the approximate temperature range of 1200 to 1800° F. until hardened, and thereafter cooling said steel.

21. An alloy steel containing: about 18 to 35% chromium, about 1 to 10% nickel-like metal, and about 1 to 10% molybdenum-like metal, in proportions to render said steel initially ferritic, characterized in being hardened by heating said steel and holding within the approximate temperature range of 1200 to 1800° F. until hardened, the resulting hardness of said steel being substantially independent of the rate of cooling and undergoing no substantial reduction in hardness after heating to temperatures as high as about 1400° F.

PETER PAYSON.